United States Patent
Hench

(10) Patent No.: US 8,046,108 B2
(45) Date of Patent: Oct. 25, 2011

(54) SYSTEM AND METHOD FOR CONVERTING OCEAN WAVE ENERGY INTO ELECTRICITY

(75) Inventor: Steven C. Hench, Dallas, TX (US)

(73) Assignee: Neptune Wave Power, LLC, Dallas, TX (US)

( * ) Notice: Subject to any disclaimer, the term of this patent is extended or adjusted under 35 U.S.C. 154(b) by 0 days.

(21) Appl. No.: 12/777,996

(22) Filed: May 11, 2010

(65) Prior Publication Data

US 2010/0228401 A1    Sep. 9, 2010

Related U.S. Application Data

(63) Continuation of application No. 12/017,755, filed on Jan. 22, 2008, now Pat. No. 7,737,569, which is a continuation-in-part of application No. 11/585,614, filed on Oct. 24, 2006, now Pat. No. 7,453,165.

(51) Int. Cl.
| | |
|---|---|
| G05D 3/12 | (2006.01) |
| G05D 5/00 | (2006.01) |
| G05D 9/00 | (2006.01) |
| G05D 11/00 | (2006.01) |
| G05D 17/00 | (2006.01) |
| F03B 13/10 | (2006.01) |
| F03B 13/12 | (2006.01) |
| F03B 17/02 | (2006.01) |
| H02P 9/04 | (2006.01) |
| F16D 31/02 | (2006.01) |

(52) U.S. Cl. ............... 700/286; 290/42; 290/53; 60/398; 60/495

(58) Field of Classification Search ............... 700/286, 700/287; 417/330–333; 290/42, 53; 60/398, 60/495
See application file for complete search history.

(56) References Cited

U.S. PATENT DOCUMENTS

| | | |
|---|---|---|
| 1,502,511 A | 7/1924 | Marvin |
| 2,990,803 A | 7/1961 | Henderson |
| 3,001,371 A | 9/1961 | Gilmore et al. |
| 3,231,749 A | 1/1966 | Hinck, III |
| 4,168,556 A | 9/1979 | Fink et al. |

(Continued)

FOREIGN PATENT DOCUMENTS

| | | | |
|---|---|---|---|
| JP | 08133079 A | * | 5/1996 |

(Continued)

OTHER PUBLICATIONS

International Search Report, and the Written Opinion issued for PCT/US2009/031675; dated Mar. 30, 2009; 8 pages.

*Primary Examiner* — Crystal J Barnes-Bullock
(74) *Attorney, Agent, or Firm* — Buskop Law Group, PC; Wendy Buskop

(57) ABSTRACT

A system and method for harnessing power associated with ocean waves and converting that power into electricity. The apparatus is a buoy that houses a vertically oriented central shaft, a pendulum, a generator mechanism, and other components that synergistically operate to optimize power output of the buoy. Both the load on the pendulum and the effective length of the pendulum may be varied in response to changing environmental conditions. Also, the buoy may be part of a network that shares environmental data and a series of best tuning responses to that data, across the network. A library of environmental data and associated tuning responses is built at a central location and shared across the network.

19 Claims, 10 Drawing Sheets

U.S. PATENT DOCUMENTS

| | | |
|---|---|---|
| 4,266,143 A | 5/1981 | Ng |
| 4,340,821 A | 7/1982 | Slonim et al. |
| 4,352,023 A | 9/1982 | Sachs et al. |
| 4,405,866 A | 9/1983 | Masuda et al. |
| 4,423,334 A | 12/1983 | Jacobi et al. |
| 4,438,343 A | 3/1984 | Marken |
| 4,490,621 A | 12/1984 | Watabe et al. |
| 4,531,063 A | 7/1985 | Vielmo et al. |
| 4,580,400 A * | 4/1986 | Watabe et al. .................. 60/398 |
| 4,631,921 A | 12/1986 | Linderfelt |
| 4,726,313 A | 2/1988 | Neal |
| 4,748,338 A | 5/1988 | Boyce |
| 4,781,023 A | 11/1988 | Gordon |
| 4,843,250 A | 6/1989 | Stupakis |
| 4,851,704 A | 7/1989 | Rubi |
| 4,954,110 A | 9/1990 | Warnan |
| 5,048,356 A | 9/1991 | Levko |
| 5,094,595 A * | 3/1992 | Labrador ...................... 417/332 |
| 5,341,757 A | 8/1994 | Digiacomo |
| 5,424,582 A | 6/1995 | Trepl, II et al. |
| 5,499,889 A | 3/1996 | Yim et al. |
| 5,696,413 A | 12/1997 | Woodbridge et al. |
| 5,789,826 A | 8/1998 | Kumbatovic |
| 5,929,531 A | 7/1999 | Lagno |
| 6,020,653 A | 2/2000 | Woodbridge et al. |
| 6,216,625 B1 | 4/2001 | Baluha |
| 6,308,521 B1 * | 10/2001 | Eylman ............................. 62/93 |
| 6,647,716 B2 | 11/2003 | Boyd |
| 6,681,572 B2 | 1/2004 | Flory |
| 6,833,631 B2 | 12/2004 | Van Breems |
| 6,994,047 B1 | 2/2006 | Pent, III |
| 7,105,939 B2 | 9/2006 | Bednyak |
| 7,199,481 B2 | 4/2007 | Hirsch |
| 7,201,624 B2 | 4/2007 | Dyhrberg |
| 7,239,038 B1 | 7/2007 | Zimmerman et al. |
| 7,298,054 B2 | 11/2007 | Hirsch |
| 7,319,278 B2 | 1/2008 | Gehring |
| 7,389,736 B2 | 6/2008 | Dyhrberg |
| 7,420,287 B2 * | 9/2008 | Smushkovich ................. 290/42 |
| 2002/0157398 A1 | 10/2002 | Boyd |
| 2005/0204987 A1 | 9/2005 | Baan |
| 2007/0012518 A1 * | 1/2007 | Gomez-Nacer ................. 185/27 |
| 2007/0137195 A1 | 6/2007 | Tayle et al. |
| 2007/0137943 A1 * | 6/2007 | Duclos ........................... 185/27 |
| 2007/0246566 A1 * | 10/2007 | Murphy ........................ 239/164 |
| 2008/0093858 A1 | 4/2008 | Hench |
| 2009/0160191 A1 | 6/2009 | Beane |
| 2010/0123313 A1 | 5/2010 | Hobdy |

FOREIGN PATENT DOCUMENTS

| | | | |
|---|---|---|---|
| JP | 2001271735 A | * | 10/2001 |

* cited by examiner

SYSTEM AND METHOD FOR CONVERTING OCEAN WAVE ENERGY INTO ELECTRICITY

CROSS-REFERENCE TO RELATED APPLICATIONS

This patent application is a continuation application of U.S. patent application Ser. No. 12/017,755, now U.S. Pat. No. 7,737,569, entitled "Method and Apparatus for Converting Ocean Wave Energy Into Electricity," filed on Jan. 22, 2008, which is a continuation-in-part application of U.S. patent application Ser. No. 11/585,614, now U.S. Pat. No. 7,453,165, entitled "Method and Apparatus for Converting Ocean Wave Energy Into Electricity," filed on Oct. 24, 2006, the disclosures of which are hereby incorporated herein by reference.

TECHNICAL FIELD

The present invention relates to the generation of electric power. More specifically, the present invention relates to a method and apparatus for converting ocean wave energy to electricity and the exploitation thereof.

BACKGROUND OF THE INVENTION

The notion of harnessing the power of ocean waves has held mankind's attention for quite some time. As such, there have been several inventions directed towards converting the kinetic energy of waves into electrical energy. However, to date, such inventions have been largely ineffective. One such invention, disclosed in U.S. Pat. No. 3,231,749, provides a "Wave Power Generator" having a buoy with a centrally mounted vertical shaft and a pendulum rotatably fixed to the shaft. The '749 patent further includes a weight fixed to the outer end of the pendulum and a generator fixed to the outer side of the weight.

The '749 patent calls for a generator mechanism to be placed along the peripheral of the pendulum arm and employs an outer planetary gear to generate power. As a practical matter, factors such as manufacturing complexity, mechanical stress, and thermal expansion would render the disclosed invention unreasonably expensive to maintain and inefficient to use. For instance, it is unlikely that the outer planetary gear would be able to maintain a perfectly circular shape, absent expensive bracing. As is known in the art, as the diameter of the outer gear increases, the mass of the structural support required to maintain circularity of the pendulum's motion under operational stress increases at a ratio greater than one-to-one. In the likely event that the outer planetary gear becomes eccentric, the pendulum mechanism would become bound or jammed, rendering the system less efficient or inoperable. Avoiding the problem of eccentricity would best be negated by placing some sort of spring-loaded device or other suspension mechanism along the pendulum to allow the pendulum to move freely. Such a mechanism also would be unreasonably expensive, complex, and difficult to maintain. Moreover, the pendulum's operating efficiency would be reduced as the suspension mechanism absorbs a portion of the pendulum's kinetic energy.

Put another way, placing the generator mechanism far from the center of rotation also places the torque moment far from the center of rotation. When the torque moment is too far off-center, any eccentricity in the rotating pendulum is amplified.

The '749 patent is inadequate for other reasons as well. For instance, the disclosed invention does not address how torque exerted on the buoy by the pendulum is handled. Without an effective "anti-torque" mechanism, the mechanical resistance of the generator will cause the buoy to rotate with the pendulum as it swings within the buoy. Because the generator is mounted to the buoy itself, the generator will see no rotation at its own frame of reference. This results in the buoy simply rotating in the ocean, and thus completely ineffective for producing energy.

BRIEF SUMMARY OF THE INVENTION

The present invention is a device for converting wave energy into useable power. The device comprises a pendulum arranged to rotate with a pivot point under the influence of wave motion. A support is provided for the pivot point. Also, the device is characterized by fins for engaging the medium in which the waves are formed so as to allow the pendulum and the pivot point to rotate with respect to the support. A generator mechanism is positioned to operate based upon rotation of said pivot point.

The present invention is also a method for generating electrical power. The method comprises allowing water waves to rotate a pendulum with a pivot point, providing a support for said pivot point, and applying a counter-rotational force to said support so as to allow said pendulum and said pivot point to rotate with respect to said support.

Further, the present invention is a system for converting wave energy into electrical energy. The system comprises a buoyant member comprising a pendulum configured to rotate under the influence of wave motion and a generating means for generating electricity by converting energy associated with said rotating pendulum, a transfer means for transferring said generated electricity, and a processing facility for processing said transferred electricity.

Finally, the present invention is an apparatus for converting wave energy into electricity. The apparatus comprises a pendulum configured to rotate with a central shaft under the influence of wave motion, a generator aligned with said central shaft to centralize torsional force exerted upon said apparatus, and a plurality of fins extending from said apparatus, said plurality of fins configured to hold said apparatus substantially rotationally stationary with respect to said pendulum.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
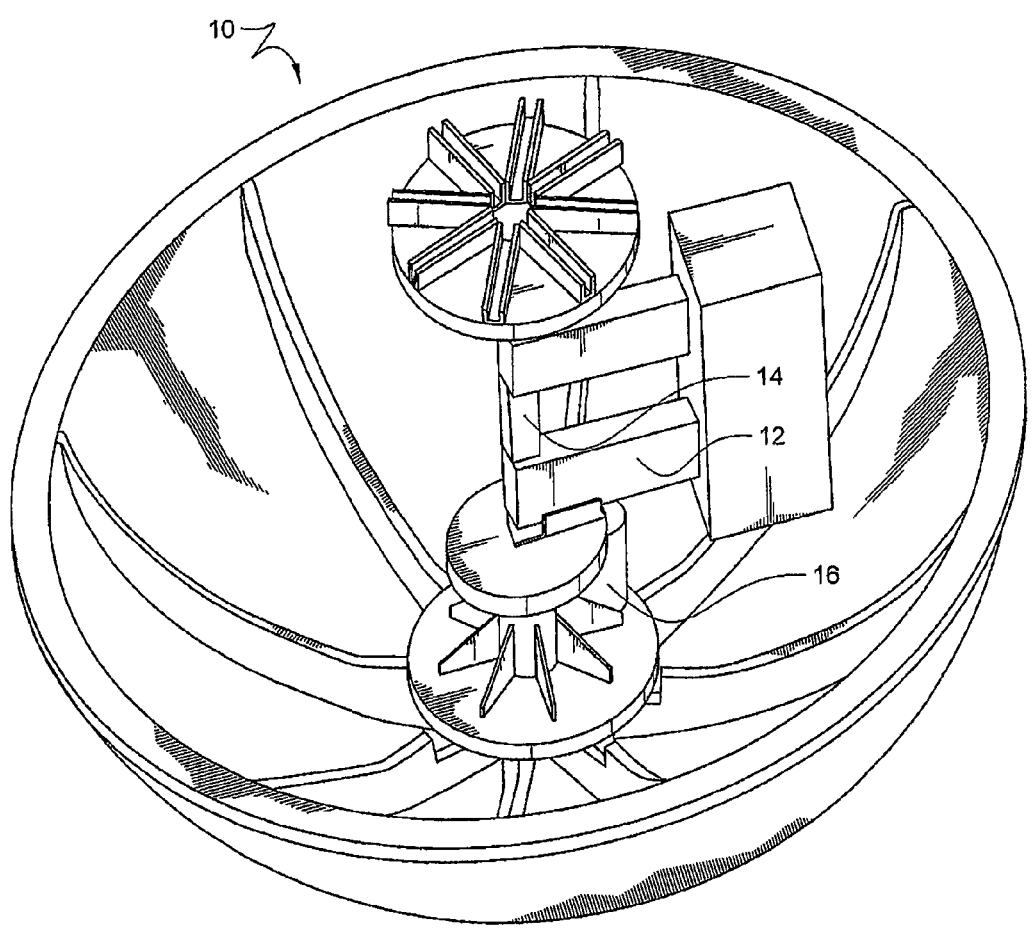
FIG. 1 depicts one embodiment of a buoy in accordance with the present invention.

Apparatus 10 is a buoy that houses components of an energy recovery mechanism which facilitate harnessing the kinetic energy of ocean waves and converting that energy into electrical energy. As will be further discussed, components within buoy 10 comprise a pendulum 12 rotating about a vertically-oriented shaft 14 within buoy 10, as buoy 10 tilts under the influence of wave motion. Rotating pendulum 12 drives a centrally located generator mechanism 16. The generated energy can then be stored at buoy 10 or transferred by conductors 60 to a remote storage facility 62. Also, embodiments are envisioned where an array of buoys 10 are employed through a cable grid 50.

Figure 2:
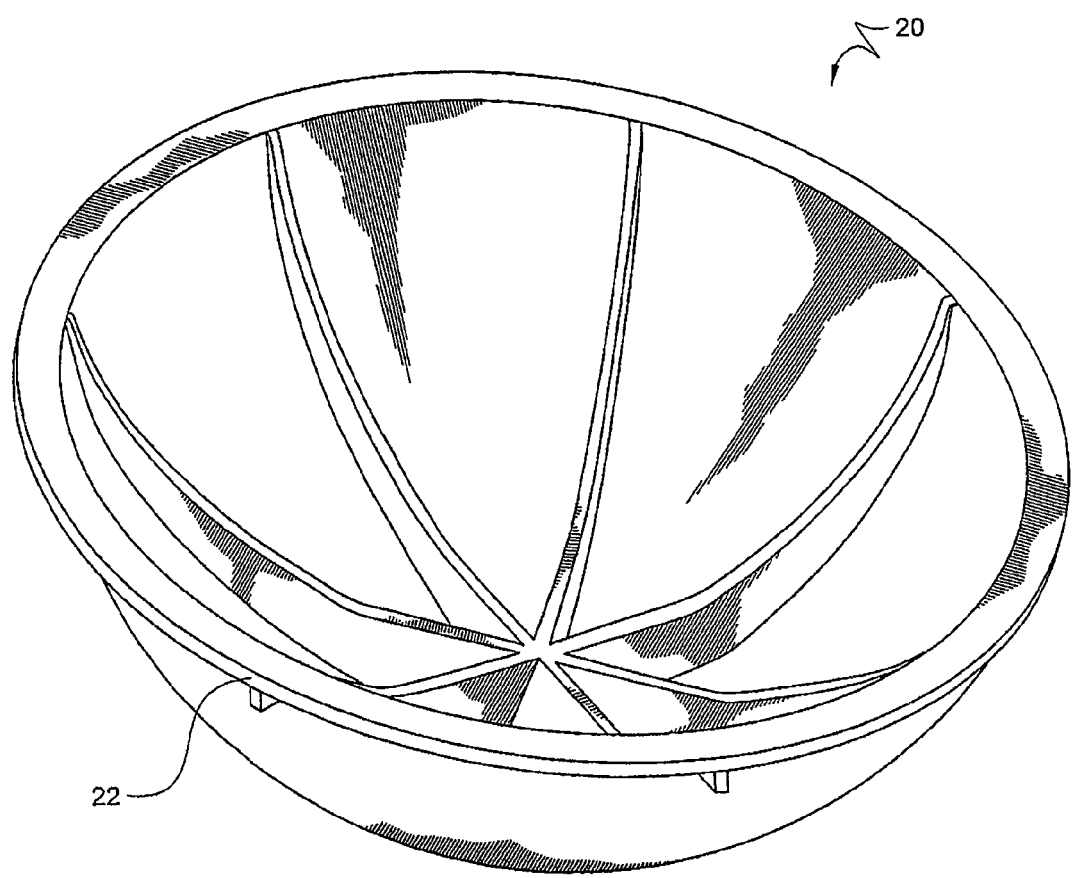
FIG. 2 depicts an embodiment of a buoy shell component in accordance with one aspect of the present invention.

As seen in FIG. 2, buoy 10 is characterized by a bottom shell component 20 and a corresponding top shell component (not shown). Bottom shell component 20 and the top shell component are preferably hemispherical in shape and are of identical dimension, where each may be combined with the other to form an enclosure having an oblate spherical shape. Preferably, the shell components are comprised of buoyant materials having relatively high strength. For instance, embodiments are envisioned where the shell components comprise composite materials, such as fiberglass or carbon fiber. However, other suitable materials will be readily apparent to those skilled in the art. Portions of bottom shell component 20 and the corresponding top shell component may be filled with a material such as foam, to enhance seaworthiness and reduce costs.

Regions within buoy 10 may be enclosed and filled with ballast, or be set to neutrally buoyant by compartmentalizing buoy 10 and venting one or more of those compartments to the ocean. This arrangement is thought to provide uniform buoyancy for buoy 10, so that buoy 10 does not have a tendency to tilt in a static position.

The tilt of buoy 10 in still water, or the static angle, preferably does not exceed three to five degrees from a horizontal plane. To examine pendulum behavior, the static angle must first be subtracted from the substantially wedge-shaped cross section of a wave that initiates pendulum movement, when pendulum 12 is substantially positioned at top of dead center. By way of example, for a common wave having a height to length, or peak to trough, ratio of 1 to 5, the average angle of the wave is approximately 11.3 degrees. Where the "back tilt" of buoy 10 is approximately three degrees, pendulum 12 must develop enough torque about shaft 14 to overcome startup friction with an overall tilt of 8.3 degrees. As pendulum 12 rotates about shaft 14 buoy 10 tilts that 3 degree distance along with it, which will be added to, rather than subtracted from, the wave's angle. Thus, for the given wave, at the bottom of the swing, the angle of buoy 10 (and pendulum 12) would be the sum of 11.3 degrees and three degrees, or 14.3 degrees. As seen, pendulum 12 increases in torque throughout the power stroke.

According to the embodiment illustrated in FIGS. 1 and 2, the shell components combine to form an oblate sphere preferably having a length to height ratio of three to one, or greater. Such a length to height ratio allows buoyant forces associated with the apparatus to be sufficiently distributed along its length, thereby counterbalancing the downward force exerted by the pendulum mass. According to the shown embodiment, the center of gravity of pendulum 12 preferably lies between shaft 14 and no more than half of the radial distance between shaft 14 and the peripheral of buoy 10. This configuration allows sufficient buoyancy to counter the pendulum mass, so that buoy 10 does not become locked in a tilted position. Also, such mathematically reproducible dimensions allow for improved efficiency in production and assembly. A length to height ratio of three to one, or greater, is desirable as it yields a configuration whereby the curvature of the combined shell components allow buoy 10 to move gracefully with, as opposed to "slapping" against, the waves. Finally, when buoy 10 is an oblate sphere having a diameter to height ratio of approximately three to one, buoy 10 has a sufficiently large surface area-to-displacement ratio.

In other exemplary embodiments the diameter of buoy 10, mass of pendulum 12, arm length of pendulum 12, and the center of force for the outboard buoyancy are interrelated. However, it is generally preferred that buoy 10 will exhibit a ratio of buoyancy to working mass on the order of between five to one and ten to one. That is, the mass of fluid displaced by buoy 10 is five to ten times greater than the mass of pendulum 12. The present inventor has found that when this condition is a satisfied, a displacement-to-ballast ratio is achieved that provides ample buoy response to wave motion.

Bottom shell component 20 has flange 22 along its outer circumference. Likewise, the corresponding top shell component would have a matching flange extending along its outer circumference. Bottom shell component 20 can be secured to the top shell component by inserting a fastening means, such as a series of bolts or screws, through aligned apertures in the respective flanges. Also, the flanges preferably have a gasket between them to enhance the seal formed between the shell components. Other useful means by which the shell components are joined to one another will be apparent to those skilled in the art. For instance, embodiments are envisioned where the shell components are joined by a welding means or clamping means.

As mentioned before, pendulum 12 is housed within buoy 10. During operation, pendulum 12 rotates about central shaft 14, which extends between central points of each shell component. As buoy 10 moves under the influence of wave motion it tilts with respect to a horizontal plane. As such, pendulum 12 is accelerated by gravity towards the point within buoy 10 having the lowest potential energy. When accelerated in such fashion, pendulum 12 is constrained to rotate about central shaft 14 in a plane perpendicular to central shaft 14. As can be easily envisioned, the traveling rise and fall motion of the waves will cause buoy 10 to tilt from side-to-side, thereby changing the point of lowest potential energy within buoy 10. As this happens, pendulum 12 will be accelerated from one point within buoy 10 to another, all the while rotating between those points.

Importantly, the present inventor understands that the semi-random nature of wave motion is not conducive to allowing pendulum 12 to rotate in a constant direction, i.e., clockwise or counter-clockwise. As such, some embodiments are configured to allow pendulum 12 to rotate freely in the clockwise or counter-clockwise direction. As will be further discussed, in either case, the kinetic energy of pendulum 12 may be captured by generator 16.

Referring again to FIG. 1, generator mechanism 16 is in mechanical communication with pendulum 12 and central shaft 14 so that rotation of pendulum 12 and central shaft 14 causes generator 16 to rotate. Preferably, generator 16 comprises a gear that is engaged with a gear located at shaft 14. As shaft 14 rotates, its gear drives the gear on generator 16. Other useful embodiments are envisioned where generator 16 is in communication with shaft 14 by another means known in the art. For example, generator 16 and shaft 14 may be in mechanical communication via a belt or chain mechanism.

According to preferred embodiments, generator 16 has an axis of rotation in close proximity to the axis of rotation of shaft 14. This arrangement allows the torque moment of generator 16 to be close to the torque moment of shaft 14. As such, the total torque felt at buoy 10 is substantially centralized. Overall, this improves the mechanical efficiency of buoy 10, that is, such a configuration provides improved flexibility in dealing with torsional loads exerted upon buoy 10 and other components, and allows various gearing ratios and power transmission alternatives to be explored.

Useful embodiments of buoy 10 comprise a plurality of generators 16, each being equally spaced about shaft 14. This provides for a particularly efficient power transmission mechanism from pendulum 12 to generator 16. According to such an arrangement generators 16 are redundant. Moreover, the symmetric arrangement of each the generators about shaft 14 allows the torque moment of a single generator 16 to be offset by the torque moment of another generator 16.

During rotation, pendulum 12 is supported by footings placed along the peripheral of pendulum 12. These footings extend around the hull of each shell component. Such an arrangement provides for efficient operation as friction is reduced and moving parts, such as gears, are not used to support pendulum 12 within the shell components.

The configuration described above provides for efficient assembly of buoy 10. That is, during assembly pendulum 12 can be held in place, by a jig for example, while shell component stringers engage the footings of pendulum 12. Preferably, pendulum 12 footings comprise channel steel or some similar material. Once contact is made, the jig can be retracted and the shell components fastened to one another along their respective flanges. As such, mounting pendulum 12 within buoy 10 does not require fasteners. Instead, pendulum 12 is held fixed about its axis of rotation by the pre-load pressure created by the engagement of the shell components.

The embodiments disclosed herein are particularly efficient at handling the torque exerted on buoy 10 by pendulum 12. During use, the torque exerted upon buoy 10 by pendulum 12 will have two components: torque exerted around the vertical axis and torque exerted around the horizontal axis. Torque exerted around the vertical axis results from rotation of pendulum 12 about axis 14. As discussed, generator 16 converts the associated mechanical energy into electrical energy. Torque around the horizontal axis is brought about by the weight of pendulum 12 itself. However, the mechanical coupling between bottom shell component 20 and the top shell component allows effective dispersion of that torque throughout entire buoy 10. That is, the shell components are joined to one another to effectively distribute the torque around the horizontal axis.

As mentioned, pendulum 12 rotates within buoy 10 thereby turning generator 16. However, generator 16, and other mechanical components housed within buoy 10 for that matter, mechanically resist the rotation. That is, generator 16 "pushes against" pendulum 12. As such, if buoy 10 is not equipped with a mechanism to overcome this mechanical resistance, buoy 10 will simply rotate with pendulum 12.

Figure 3:
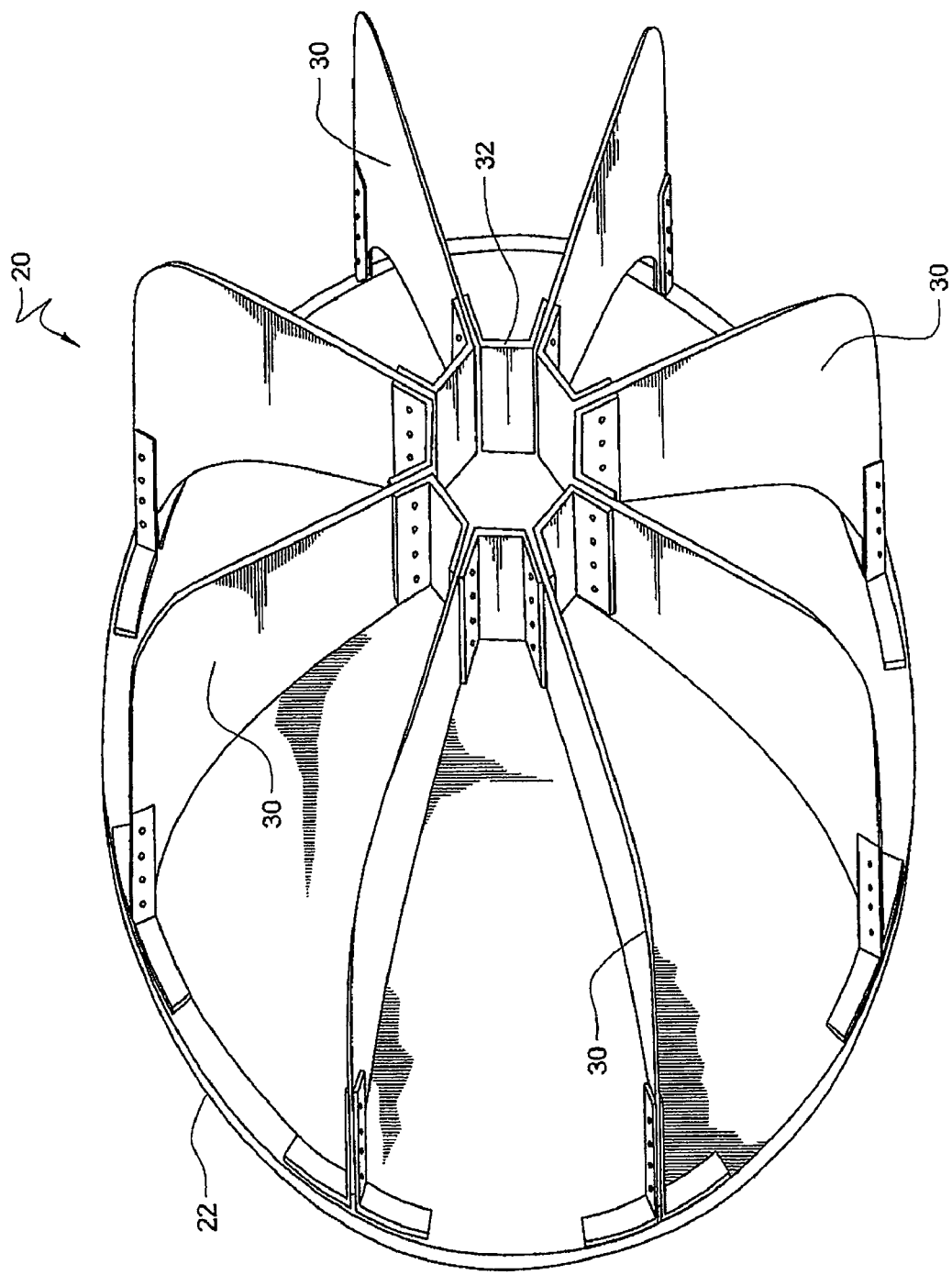
FIG. 3 depicts an embodiment of a buoy fin array component in accordance with one aspect of the present invention.

Referring to FIG. 3, fins 30 extend from bottom shell component 20. In the preferred embodiment, fins 30 collectively form a fin array, which serves as a "counter-torque" mechanism providing sufficient resistance to overcome the mechanical resistance of generator 16 and other components. Specifically, fins 30, acting together, entrain a mass of water sufficient to hold buoy 10 rotationally stationary as pendulum 12 rotates within buoy 10. Fins 30 should be of sufficient size to effectively inhibit rotation of buoy 10 so that pendulum 12 can do work against generator 16. As such, fins 30 can be of sufficient dimension to entrain a mass of water several times larger than the mass of pendulum 12.

As seen in FIG. 3, fins 30 are attached to buoy 10 by coupling to flange 22. Coupling fins 30 to flange 22 may be accomplished by screwing or bolting fins 30 to flange 22 by means known in the art. There are any number of mechanisms by which fin array 30 can be attached to buoy 10. However, coupling fins 30 directly to flange 22 in such manner is preferred because it allows each fin 30 to be easily attached or detached from buoy 10. As such, each fin 30 of the fin array is preferably a separate, non-integral component that can be replaced in the event it is damaged or otherwise needs to be replaced. Because each fin 30 is an external item, different sizes can be used depending on the size of buoy 10, prevailing ocean conditions, etc.

Again referring to FIG. 3, each fin 30 extends radially from a central portion of bottom shell component 20. However, as seen, fins 30 do not meet one another at a central point. Instead, fins 30 are coupled to one another by a bracketing ring 32. The use of bracketing ring 32 is preferred as it imparts relatively high strength to fin array 30. According to particular embodiments, fins 30 may be bolted on or screwed to bracketing ring 32. As such, individual fins may be removed by unbolting that fin from flange 22 and ring 32, and a replacement fin may be inserted in its place.

Figure 4:
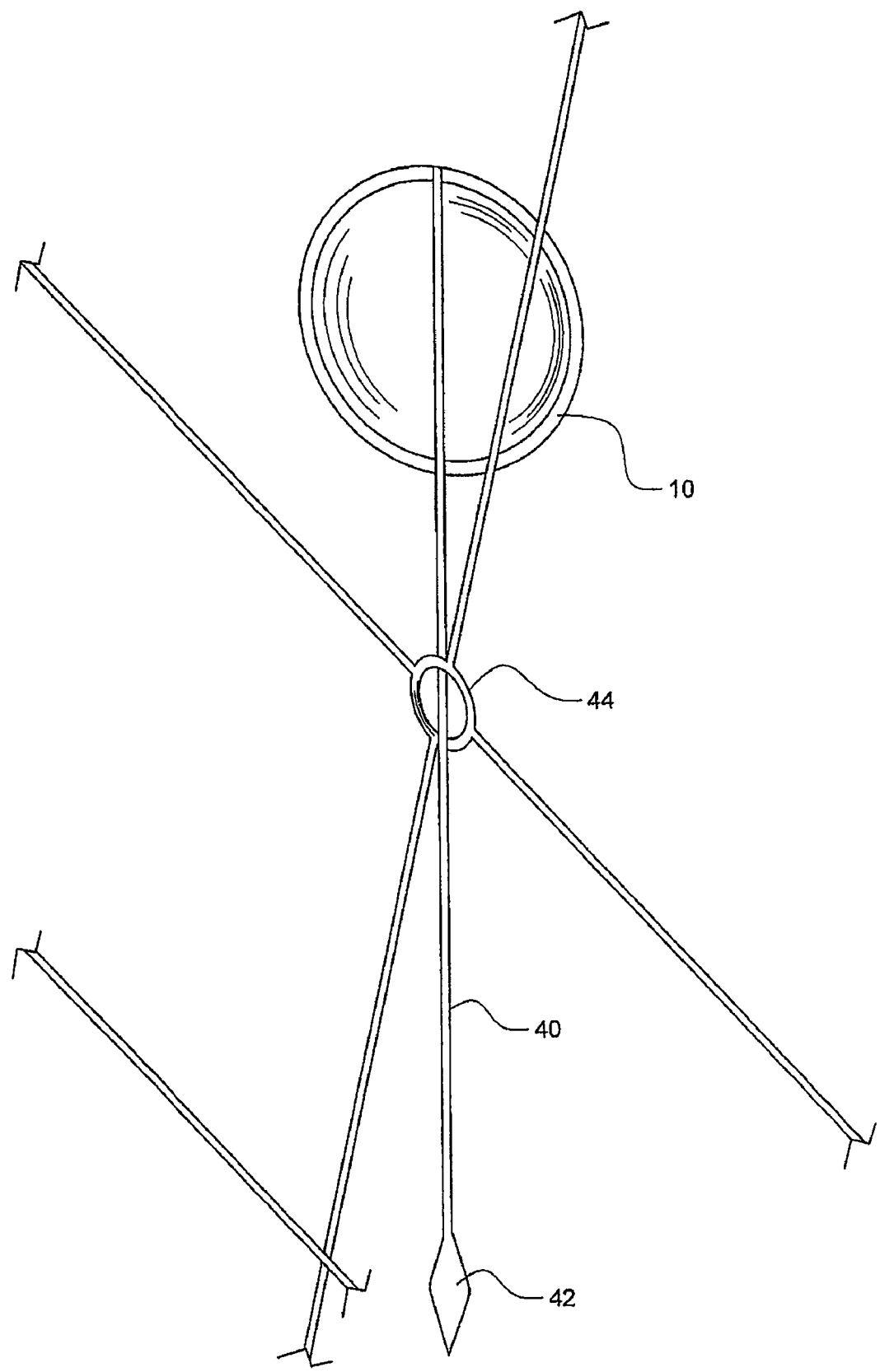
FIG. 4 depicts a buoy mooring system according to one aspect of the present invention.

Referring to FIG. 4, mooring line 40 is shown extending between buoy 10 and counterweight 42, through restraining ring 44. In a preferred embodiment, mooring line 40 extends from a central point of buoy 10, for instance the central point of bottom shell component 20, so that buoy 10 remains balanced along the water surface. According to preferred embodiments, mooring line 40 is configured with buoy 10 to allow unconstrained rotation of the buoy 10 without creating torsion on mooring line 40. Specifically, counterweight 42, attached along the bottom end of mooring line 40, allows buoy 10 to move up and down along the wave surface according to wave motion. Counterweight 42 also serves as a bottom-centered ballast and a means to pull buoy 10 back into vertical alignment with restraining ring 44. Importantly, mooring line 40 freely moves within restraining ring 44, vertically and rotationally, and is constrained within restraining ring 44 by counterweight 42. Such an arrangement is thought to be particularly beneficial in that buoy 10, and likewise mooring line 40, can rotate without twisting or breaking mooring line 40. It should be appreciated that counterweight 42 plays an important role in increasing the power captured by buoy 10. That is, counterweight 42 serves as a mechanism that works against the lateral forces exerted upon buoy 10 by waves at the surface. Specifically, counterweight 42, by exerting downward force on buoy 10 about a center point, resists lateral motion of buoy 10. By acting to resist the lateral forces at or near the surface, counterweight 42 prompts buoy 10 to work against the waves themselves, thereby improving system performance.

Figure 5:
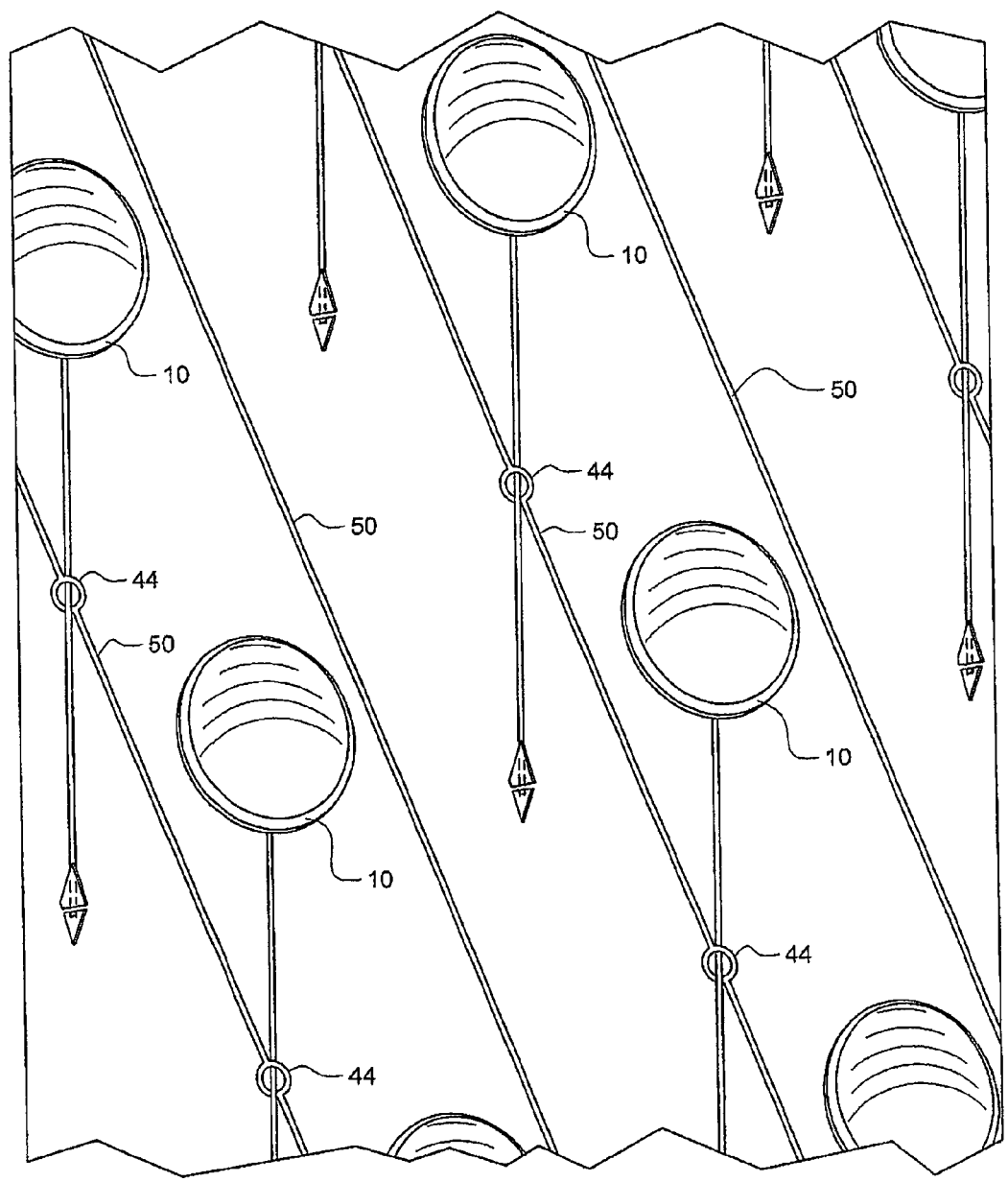
FIG. 5 depicts a buoy array according to one aspect of the present invention.

As best seen in FIG. 5, a plurality of buoys 10 can be arranged in relative proximity to one another to form a buoy array. As shown, a number of restraining rings 44 are placed within a grid of cables 50. Cables 50, in combination with rings 44, form an anchoring base for the buoy array. Each buoy 10 is associated with its own mooring line 40, counterweight 42, and restraining ring 44. As a result, each buoy 10 is provided a range of vertical and lateral motion so as to maximize wave-induced motion while preventing contact with adjacent buoys.

Figure 6:
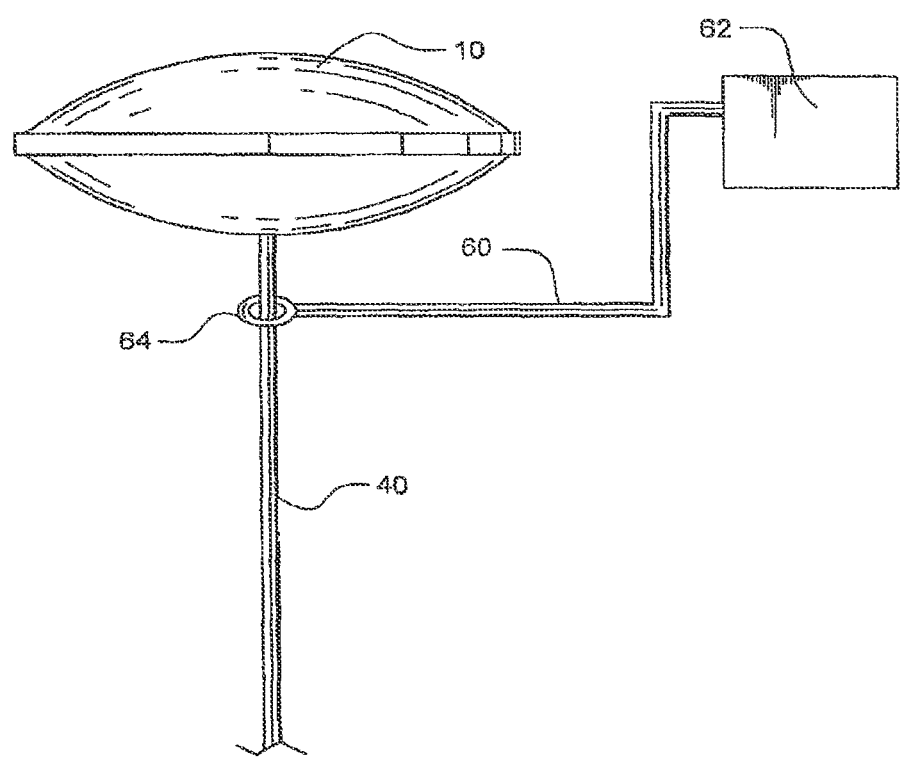
FIG. 6 depicts an electricity production system according to one aspect of the present invention.

Referring to FIG. 6, power communication means 60 is shown extending between buoy 10 and power storage unit 62. Preferably, power communication means 60 is a conductor that transfers electrical current between buoy 10 and a remote location, such as power storage unit 62. As shown, power communications means 60 is attached to buoy 10 at or near the top of mooring line 40. Further, power communications means 60 is attached to mooring line 40 using a sealed slip ring 64, as known in the art. A sealed slip ring is preferable because it allows each buoy 10, and likewise mooring line 40, to freely rotate without causing communication means 60 to wrap around mooring line 40. As such, binding or strain placed on communication means 60 from undue rotation is avoided. Power communication means 60 can transfer electricity from buoy 10 to power unit 62 as electricity is generated, or electricity may be stored on buoy 10 and transferred at a later time.

Figure 7:
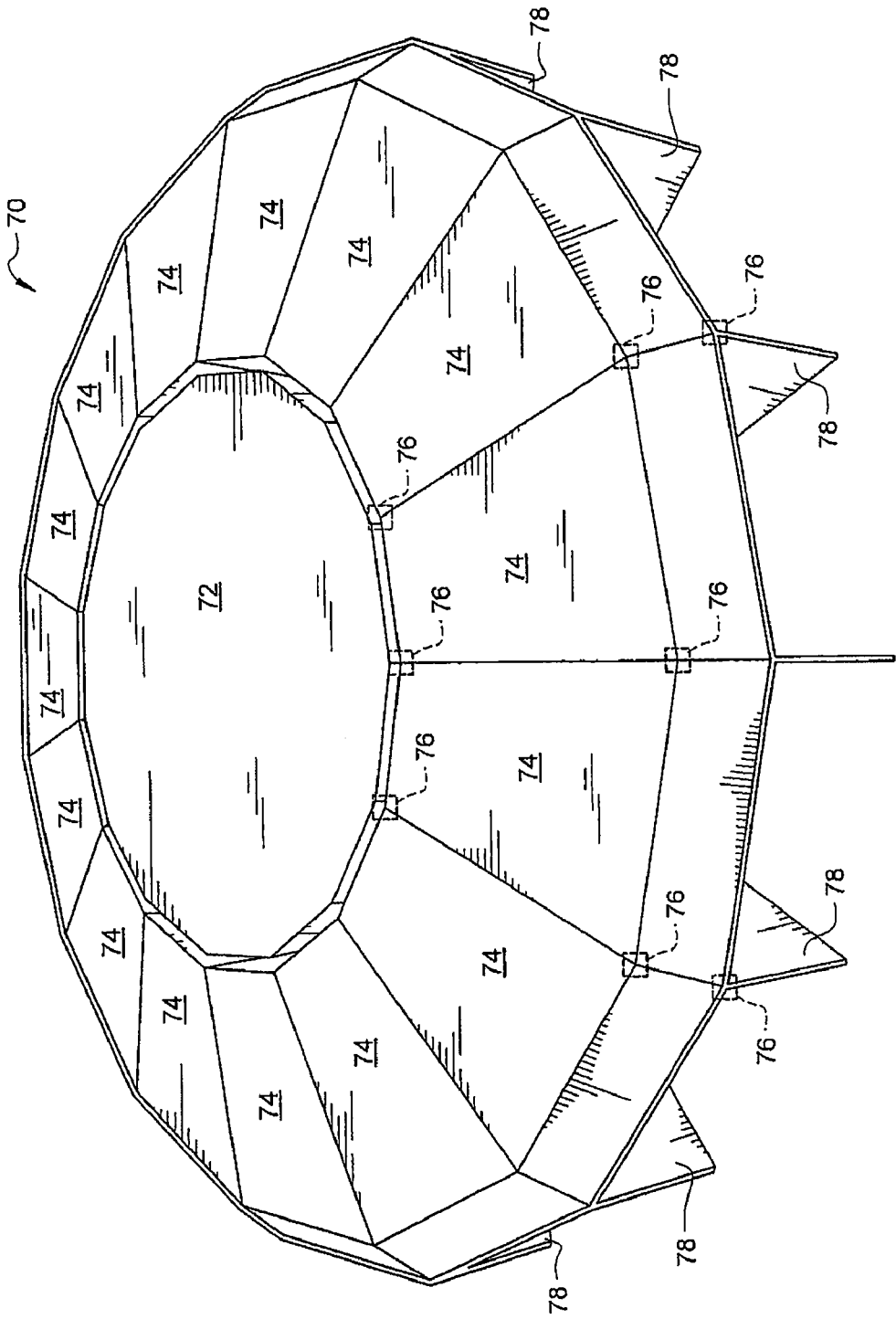
FIG. 7 depicts another embodiment of a buoy in accordance with the present invention.

Referring to FIG. 7, and alternative embodiment of a buoy according to the present invention is shown. Buoy 70 comprises a central compartment 72 surrounded by a plurality of outer compartments 74. Compartment 72 houses a working pendulum assembly such as, for example, the assembly of pendulum 12 as described with respect to FIG. 1.

Each outer component 74 are of identical dimension and have a "faceted" design, being characterized by a number of flat surfaces. Preferably, each outer component 74 is comprised of buoyant materials having relatively high strength. For instance, embodiments are envisioned where outer components 74 are made of composite materials, such as fiberglass or carbon fiber. However, other suitable materials will be readily apparent to those skilled in the art. Portions of each outer component 74 may be filled with a material such as foam, to enhance seaworthiness and reduce costs.

Each outer compartment 74 is attached to an adjacent outer component 74 and central component 72 by fastening means 76. Accordingly, fastening means 76 are located at the junction between each outer component 74 and the junction between each outer component 74 and central component 72. Fastening means 76 may a number of mechanisms sufficient to hold each outer component 74 substantially fixed with respect to the other and with respect to central component 72. A number of mechanisms, such as a bolt combination or locking combination, will be readily apparent to those skilled in the art. The design of buoy 70 is particularly advantageous in view of its easy transport and assembly. For example, when buoy 70 needs to be moved from one location to another, each outer component 74 can be detached from the other so that buoy 70 is disassembled into several individual components, including each outer component 74 and central component 72. When completely disassembled, buoy 70 can be transferred piece-by-piece from one location to another. Accordingly, heavy equipment is not required as it would otherwise be to transfer buoy 70 in its entirety.

Figure 8:
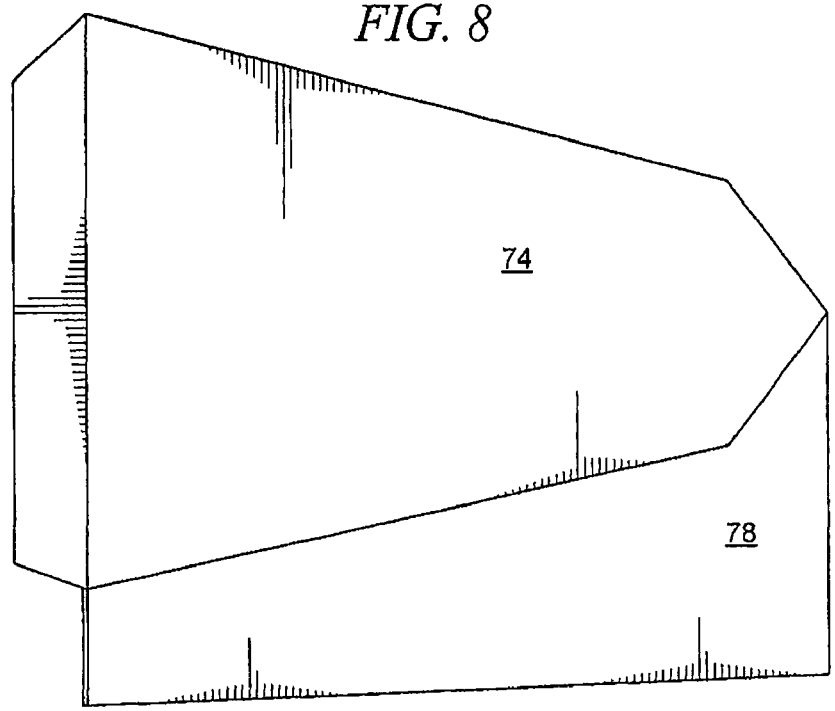
FIG. 8 depicts an outer component and fin combination in accordance with the present invention.

Referring to FIG. 7 and FIG. 8, one or more fins 78 extend from each outer compartment 74. Each fin 78 serves as a "counter-torque" mechanism providing sufficient resistance to overcome the mechanical resistance of generator 16 and other components. The combination of fins 78 is preferably operable to entrain a mass of water sufficient to hold buoy 70 rotationally stationary as pendulum 12 rotates within central component 72; that is, the fin combination should be of sufficient dimension to entrain a mass of water several times larger than the mass of pendulum 12. Accordingly, each fin 78 is preferably of sufficient size to effectively inhibit rotation of buoy 70 so that pendulum 12 can do work against generator 16.

Each fin 78 is advantageously detachable from its corresponding outer component 74. As such, each fin 78 can be removed when buoy 70 is moved from one location to another. Each fin 78 can attach to a corresponding outer component 74 by a number of means known in the art. For example, each fin may slide within, and be held in place by, guides placed along the bottom of each outer component 74. Coupling fins 78 to outer component 74 in such manner is preferred because it allows each fin 78 to be easily attached or detached from buoy 70. Of course, there are any number of mechanisms by which fins 78 can be attached, as will be readily apparent to those skilled in the art.

Each fin 78 extends radially from central component 72. Similar to the discussion above with respect to FIG. 3, but not explicitly shown in FIGS. 7 and 8, fins 78 may not meet one another at a central point. Instead, fins 78 may be coupled to one another by a bracketing ring (not shown). The use of a bracketing ring imparts relatively high strength to the array of fins 78. According to particular embodiments, fins 78 may be bolted on or screwed to the bracketing ring. As such, individual fins may be removed by unbolting that fin from the bracketing ring and outer component 74, and a replacement fin may be inserted in its place.

Figure 9:
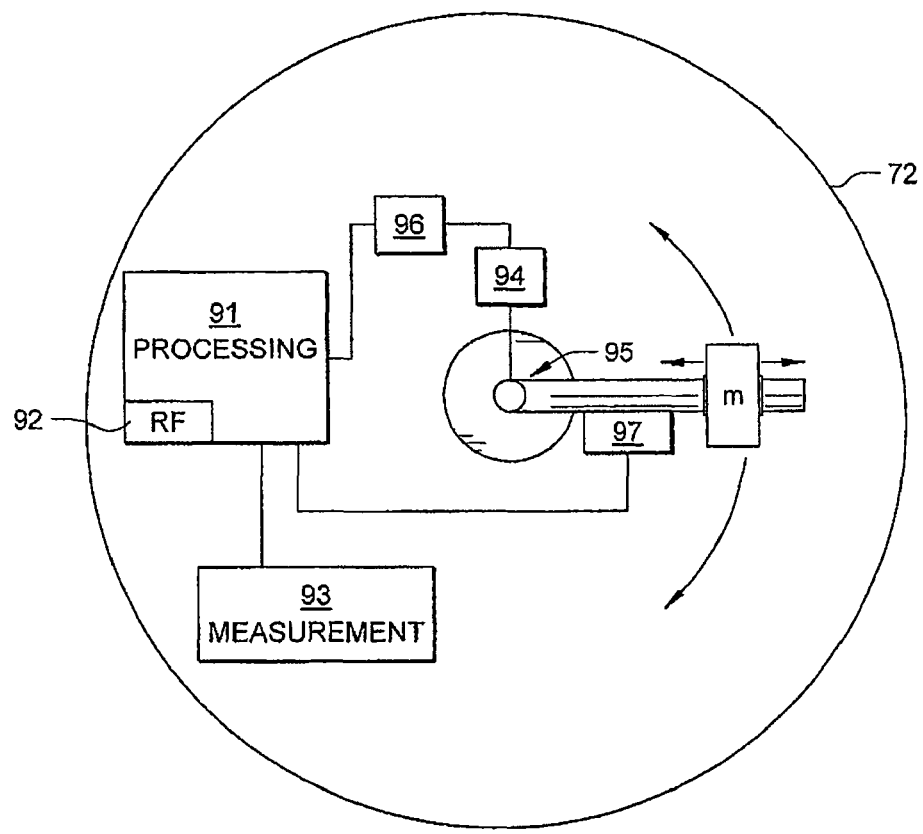
FIG. 9 depicts a pendulum assembly in accordance with the present invention.

Referring to FIG. 9, an embodiment of a pendulum assembly is shown. The depicted pendulum assembly may be housed within shell components 20 as shown in FIG. 1, or in central component 72 as shown in FIG. 7. For purposes of this discussion, the pendulum assembly will be described as being housed within central component 72 as shown in FIG. 7. The pendulum assembly shown in FIG. 9 is advantageous in that it is operable to maximize the power output of a buoy, e.g., buoy 70. The pendulum assembly comprises pendulum 12 rotating about a central shaft 14 as previously described. However, as will be discussed in greater detail below, the pendulum assembly further includes processing module 91, communication module 92, measurement module 93, load variation mechanism 94, and length variation mechanism 97.

The combination of these additional components serves to optimize buoy 70, specifically, these component work together to maximize the power output of buoy 70.

It should be appreciated that a pendulum's power output over time is maximized where the pendulum rotates in a resonant state. Ideally, the present invention would operate such that the pendulum rotates in a resonate state in a constant direction. However, as a practical matter, for a given set of wave conditions a resonant or even quasi-resonant state may not necessarily be achieved. As such, the present invention is implemented to maximize power output even when resonance cannot be achieved. In a preferred embodiment a computational model is implemented, e.g., in processing module 91, to evaluate a pendulum's power output under a particular set of observed conditions or estimate power output under predicted future conditions, or even purely hypothetical conditions. As will be further described, the computational model is further implemented to maximize a pendulum's power output by effectuating changes, e.g., in pendulum length and/or pendulum load, under a set of environmental conditions.

The computational model used to maximize power output over time can be implemented in hardware, software, firmware, or a combination of each. According to a preferred embodiment, each buoy 70 contains processing module 91, which has stand alone on-board processing components sufficient to analyze measured environmental data and execute instructions to maximize pendulum power output in response to that analysis. Accordingly, each buoy 70 is capable of operating independently of other buoys and is responsible for maximizing its own power output. According to particular embodiments, processing module 91 may employ the computational model at the buoy itself to obtain a set of instructions for optimizing power output according to local conditions. However, processing module 91 may also retrieve instructions from a central location, where the computational model has been executed at the central location. In any event, module 91 executes the instructions necessary to achieve optimized pendulum instructions.

As mentioned, buoys may operate in a grid containing a number of other buoys. As such, it may be advantageous for one buoy 70 in the grid to be aware of the behavior of other buoys in the grid. Accordingly, processing module 91 may further contain on-board communication components, e.g., RF wireless communication module 92, to enable buoys to share information such as local power output data, local environmental conditions, etc. This information may be shared directly between buoys or may be transmitted to one or more central stations, where the central stations collect and distribute the information among the buoys. Sharing this information may be beneficial for predicting local environmental conditions at a given buoy and making necessary adjustments to maximize power in anticipation of those conditions.

Other embodiments are envisioned where each buoy contains minimal hardware, software, etc., such that the bulk of data processing is performed at one or more central stations. In these cases, the components of processing module 91 are typically shared between a buoy 70 and a central station. According to such embodiments, each buoy is equipped with components required to effectuate adjustments needed to maximize power output, but is not required to contain data processing components. Rather, central stations are employed to process the data and perform other functions, such as monitoring individual buoy performance, executing remote diagnostic assistance, performing trouble shooting, and the like. The central stations may be located within a grid or may located at a remote location. Also, these central stations may be configured to operate autonomously, or may provide a user interface where an operator interacts with the system and enables execution of the monitoring and diagnostic functions described above.

The concepts of information-sharing between buoys in a single grid can be readily applied to buoys in different grids, where buoys contained in different grids communicate with one another, or centralized nodes associated with a particular grid communicate with centralized nodes associated with other grids. Such inter-grid communication may assist one grid in preparing for predicted environmental conditions, whether that information is shared directly with buoys in the grids or sent to a central node and then distributed among buoys.

Figure 10:
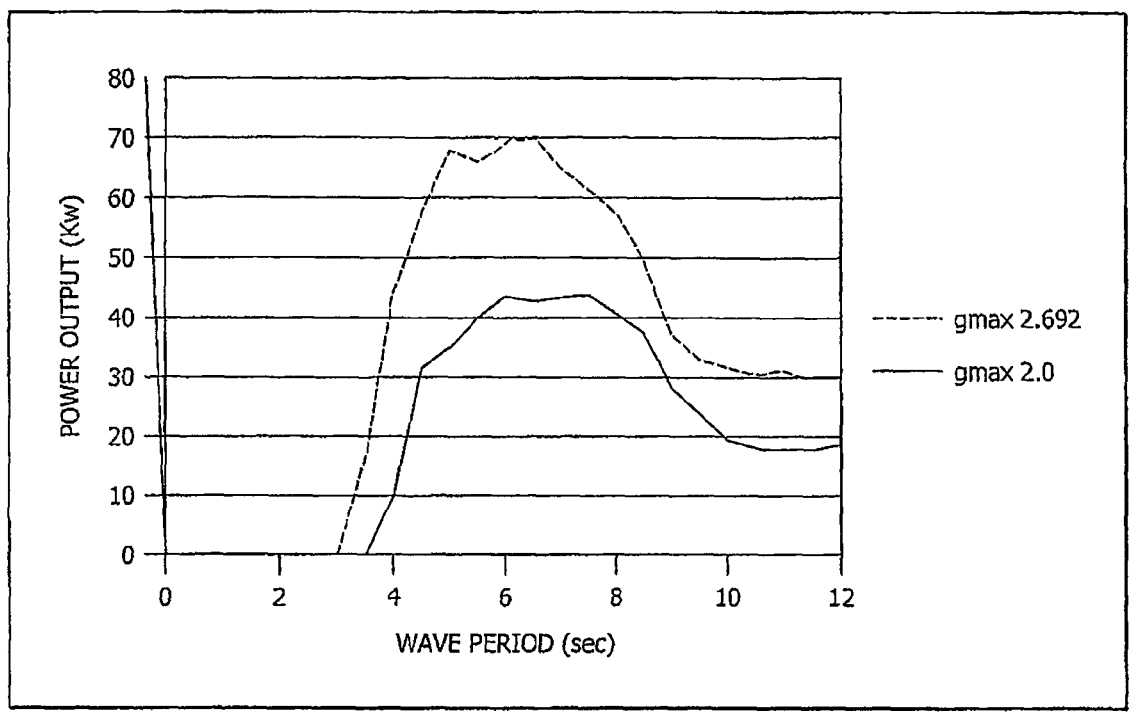
FIG. 10 is a graph of power output for a buoy as a function of wave period for a steep wave versus a shallow wave.

According to a preferred embodiment, the computational model mentioned above reveals that, for a pendulum 12 of fixed length subject to constant (or near constant) mechanical load, the rotational velocity of the working pendulum, and likewise its energy output, depends upon a combination of conditions. These conditions predominantly include wave periodicity, wave steepness, wave interaction with the pendulum's natural frequency, and the amount of drag placed upon the pendulum. An illustration of this concept is presented in FIG. 10, which depicts a graph of a buoy's power output, at the same configuration, as a function of wave period for a steep wave (shown as a solid line) and a shallow wave (shown as a dashed line). As seen, power output over time is greater for the steeper wave. However, peak power production for a shallow and steep wave does not occur during the same time interval within the wave period. As seen, maximum power output occurs during an earlier time interval within the period for a steeper wave. This is clear example of the variation in maximum power output in terms of environmental conditions.

In view of the above, each buoy 70 includes measurement module 93, which is responsible for measuring these conditions and communicating the same to processing module 91. To that end, measurement module 93 includes measurement instruments for measuring wind speed, buoy tilt with respect to horizon, time intervals, pitch, roll, translation, and the like. Measurement module 93 may stand alone from processing module 91 as an independent subsystem or may be configured as part of processing module 91 itself. In any event, the relevant problem becomes one of maximizing power output, i.e., finding the resonant or near resonant state of the working pendulum, under present conditions or under predicted conditions. To that end, it has been found that the pendulum can be brought to a resonant or near resonant state by varying the load on the pendulum arm and/or varying the distance between the pendulum's axis of rotation and its working mass. Therefore, according to preferred embodiments, the pendulum is brought to a resonant state (or substantially resonant state) by varying the load on the pendulum and/or varying the pendulum's effective length (i.e., the distance between the axis of rotation and working mass) in response to observed conditions or based upon predicted conditions.

As seen in FIG. 9, load variation mechanism 94 is shown. The load variation schemes described herein are used to control the velocity of, and therefore the kinetic energy of, the buoy's rotating pendulum. That is, increasing the load on pendulum 12 decreases its rotational velocity, and therefore, decreases the kinetic energy associated with the moving pendulum on the order of $\frac{1}{2}mv^2$, where m is the mass of pendulum 12 and v is the velocity of pendulum 12. Conversely, decreasing the load on pendulum 12 increases the rotational velocity of pendulum 12, and therefore, increases the kinetic energy associated with the moving pendulum on the order of $\frac{1}{2}mv^2$.

As mentioned above, it is most desirable for pendulum 12 to rotate in a resonate state in the same direction (i.e., clockwise or counterclockwise) for an extended period of time. As can be easily seen, if pendulum 12 undergoes a change in rotational direction, its rotational velocity decreases to the point of zero velocity before accelerating in the opposite direction. Necessarily, then, the energy output of the working pendulum decreases and becomes zero for at least some point in time during such a change in rotational direction. When this occurs, energy production of buoy 70 over time substantially decreases.

Accordingly, it is desirable to increase the load on pendulum 12 in response to the pendulum's tendency to reverse direction under the influence of wave motion. Doing so inhibits the pendulum's ability to reverse direction and move across the point of zero velocity. It naturally follows that the mechanical load is decreased in response to the pendulum's tendency to rotate in a constant direction, thereby promoting rotation in that direction.

According to the shown embodiment, load variation mechanism 94 is implemented as an electro-mechanical braking device, which mechanically brakes pendulum 12 in accordance with signal received from processing module 91. According to a preferred embodiment, brake 95 is actuated so that it effectively brakes the pendulum 12 in response to electrical current through corresponding braking circuit 96. The electromechanical braking is achieved varying the current across the braking device. For example, rapidly switching circuits may be used to control current flow and therefore resistance applied to the pendulum. Further, load variation mechanism may be implemented using other circuitry devices, such as thyristors or SCR devices that serve to gate output of circuit 96. If there is no electro-mechanical load on the alternator or generator; as a result, the working pendulum rotates free from added resistance. Of course, when the gate device closes circuit 96, the electro-mechanical load exerted upon the alternator or generator mechanism is directly proportional to the current through the closed circuit.

According to another embodiment, mechanism 94 comprises a mechanical brake device 95 placed about central shaft 14. Brake 95 may be continually actuated between an open and closed position, where brake 95 increasingly clamps shaft 14 toward a closed position to resist rotation of shaft 14 and moves toward an open position to continually reduce or eliminate resistance to rotation of shaft 14. Brake 95 is actuated in response to signals provided by electrical component 96, which may employ a gate circuit as known in the art. By way of example, where pendulum 12 drives a generator or alternator, variation mechanism 94 may be implemented as an electro-mechanical braking mechanism.

It should be appreciated that embodiments disclosed herein are not limited by the specific implementation of load variation mechanism 94. For example, other embodiments are envisioned where load variation mechanism 94 is implemented using one or more field-type generators. In such case, field-type generators would be implemented electromagnets to vary the load. Thus, the amount of power produced by the generator can be precisely controlled by varying the electrical current supplied through the electromagnet circuits. By way of further example, where the pendulum is to actuate a pump (e.g., according to a hydraulic power scheme), a network of valves may be used to control the working fluid flow rate to a corresponding working circuit.

It has been found that more often than not a change in wave conditions sufficient to justify a change in the load exerted upon pendulum 12 occurs relatively slowly, e.g., on the order of a few to several minutes. According to present observations, such a change is typically brought about by a series of incremental changes occurring over a period of minutes. As such, once an appropriate load is determined under a particular set of conditions, the load can be incrementally stepped up or down in response to changing conditions. Because the system does not require fast-acting load variation, its computational requirements and associated energy consumption is relatively low. Although not typically required, the embodiments described herein are also capable of varying the load exerted upon pendulum 12 very quickly, i.e., on the order of seconds, depending upon the rate of change in wave conditions.

Referring again to FIG. 9, length variation mechanism 97 is implemented to actuate work mass, M, between a minimum and maximum distance from shaft 14, along pendulum 12. For a pendulum moving under the influence of wave motion, for any given set of wave conditions, there is an effective pendulum length at which the power output of a buoy is maximized. By incorporating length variation mechanism 97, which is operable to vary the length of the pendulum, the effective pendulum length can be tuned across a range of conditions. The degree of this so-called tunability is limited only by the range over which the working mass can be moved along the pendulum.

As mentioned, processing module 91, in combination with measurement module 93, measures and analyzes local environmental condition data and determines where mass M should be positioned along pendulum 12, so that power output of buoy 70 is maximized. As known in the art, a pendulum accelerated by gravity has a natural frequency that is inversely proportional to the effective length of the working pendulum (i.e., the distance between its axis of rotation and working mass). As such, increasing the effective length of the pendulum accelerated by gravity increases the period of, or slows down, the pendulum. Conversely, decreasing the effective length of the pendulum (i.e., moving the working mass closer to the axis of rotation) decreases the period of, or speeds up, the pendulum. While the period itself will depend upon the angle of pendulum's plane of rotation with respect to horizon, given a fixed length between the axis of rotation these features are independent of the gravitational force acting upon the pendulum, and therefore, apply equally regardless of the angle of the pendulum with respect to the horizon.

According to preferred embodiments, the mechanism for varying the effective pendulum length can be implemented according to a number of different means. For example, a mechanical means, employing the use of hydraulic or gear-driven actuators, can be used to move the working mass between positions. Also, in the event the working mass comprises fluid, a fluid transport system can be employed where fluid is transferred to different points along the pendulum, thereby changing the mass distribution along the pendulum length.

A buoy's ability to independently tune its pendulum is important because, as a practical matter, a buoy will be one buoy within a grid of buoys. Current observations reveal that as a front of waves passes through such a grid, the waves are altered (e.g., in terms of shape, direction, period, etc.) as they interact with each buoy. As a result, wave conditions at one point in the grid will not be the same as wave conditions on at another point in the grid. Therefore, it is desirable that each buoy be capable of some degree of autonomous tuning to best adjust to local wave conditions. According to a preferred embodiment, the computer model discussed herein comprises computer simulations that reveal a power "fingerprint" of a buoy having a certain configuration under a given set of conditions. While real conditions may present a more complex system, nevertheless, these simulations yield fingerprints very similar to those found in the real-world conditions.

The invention described herein is made more robust by the implementation of system-wide "learning." According to a preferred embodiment, a network system is provided where buoys within that system interact with one another, perhaps through a central station. The central station collects information related to sea conditions based, at least in part, upon a buoy's power output fingerprint at a given configuration. The system "learns" these fingerprints as being associated with a set of environmental conditions and begins library of those conditions. Further, the system then adjust the configuration (i.e., pendulum load and effective length) of a pendulum until it finds the optimum fingerprint for that set of conditions. After a "best setting" it can be disseminated throughout the system, either being stored centrally or locally at each buoy.

By way of example, suppose buoy 70 determines wave behavior through its on-board inertial sensors. Buoy 70, using processing module 91, may first consult on-board memory within system 91 to look for ideal configuration settings to maximize its power output. If the on-board memory does not contain the measured conditions (or an optimized setting), then buoy 70 may transmit the measured conditions to a central station using communication module 92. If the central station finds ideal configuration settings for the given conditions, it communicates the same to buoy 70, which then implements those settings. If the central station does not find a match, it would inform buoy 70 that no match is found and perhaps offer the closest configuration available. In any event, the conditions are recorded and stored in a library for future consultations. According to this system, the library will grow at an inverse exponential rate (i.e., where library growth decreases over time). In any event, the collective buoy network becomes increasingly efficient at maximizing its power as the information data base market possible for each individual buoy to rapidly achieve and maintain optimal tuning.

Figure 11:
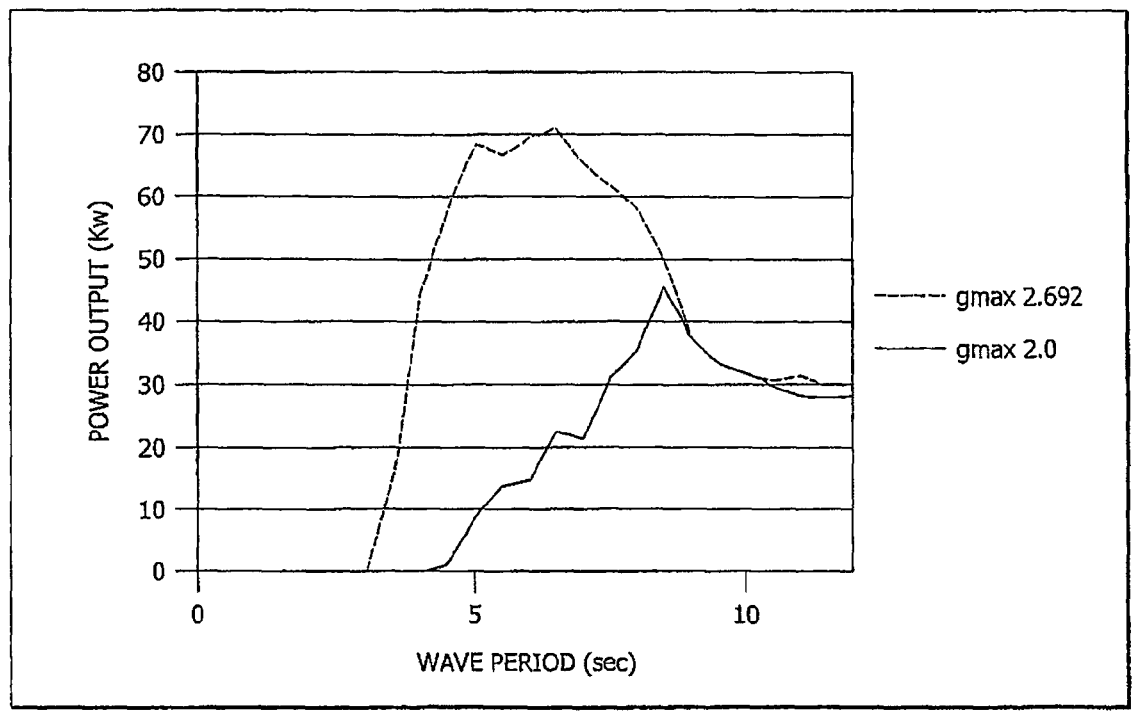
FIG. 11 is a graph of power output for an optimized system according to the present invention versus a non-optimized system, each subject to identical conditions.

Reference to FIG. 11 demonstrates the significance of the optimization achieved by embodiments of the present invention. FIG. 11 is a graph of power output for an optimized system according to the present invention (shown as a solid line) and a non-optimized system (shown as a dashed line), each subject to identical conditions. As seen, power output for each system converges as the wave period increases. However, before convergence, power output for the optimized system is significantly greater than that of the non-optimized system.

Figure 12:
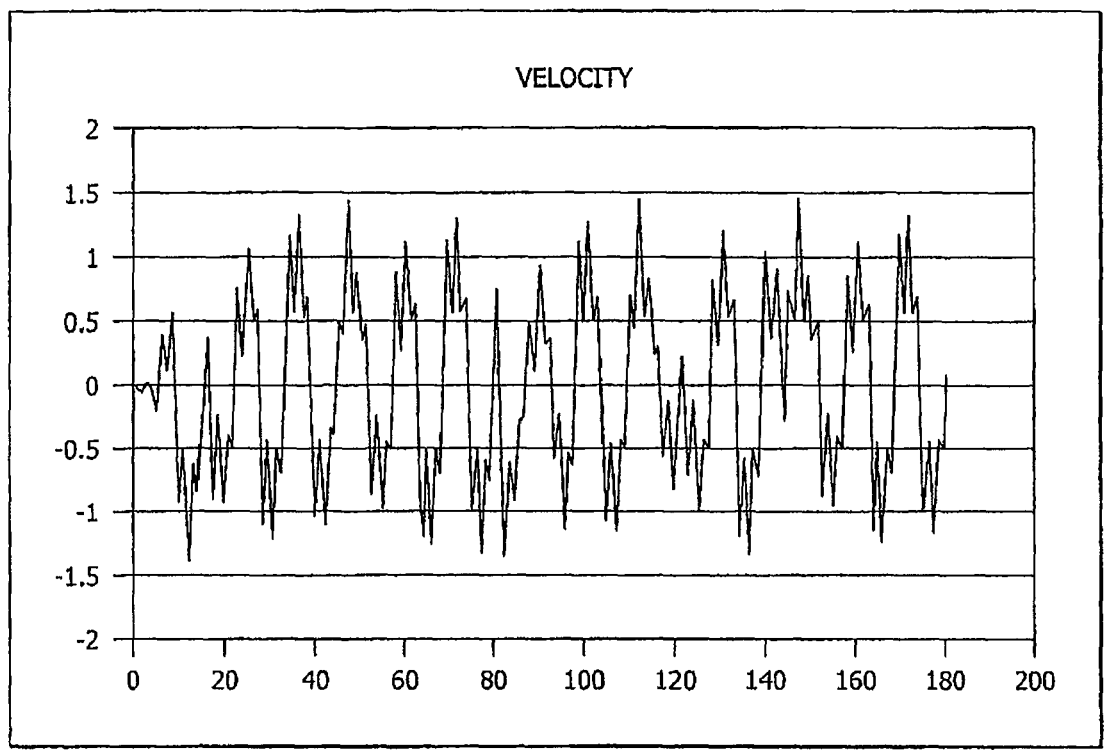
FIG. 12 is a velocity plot for a non-optimized system.
Figure 13:
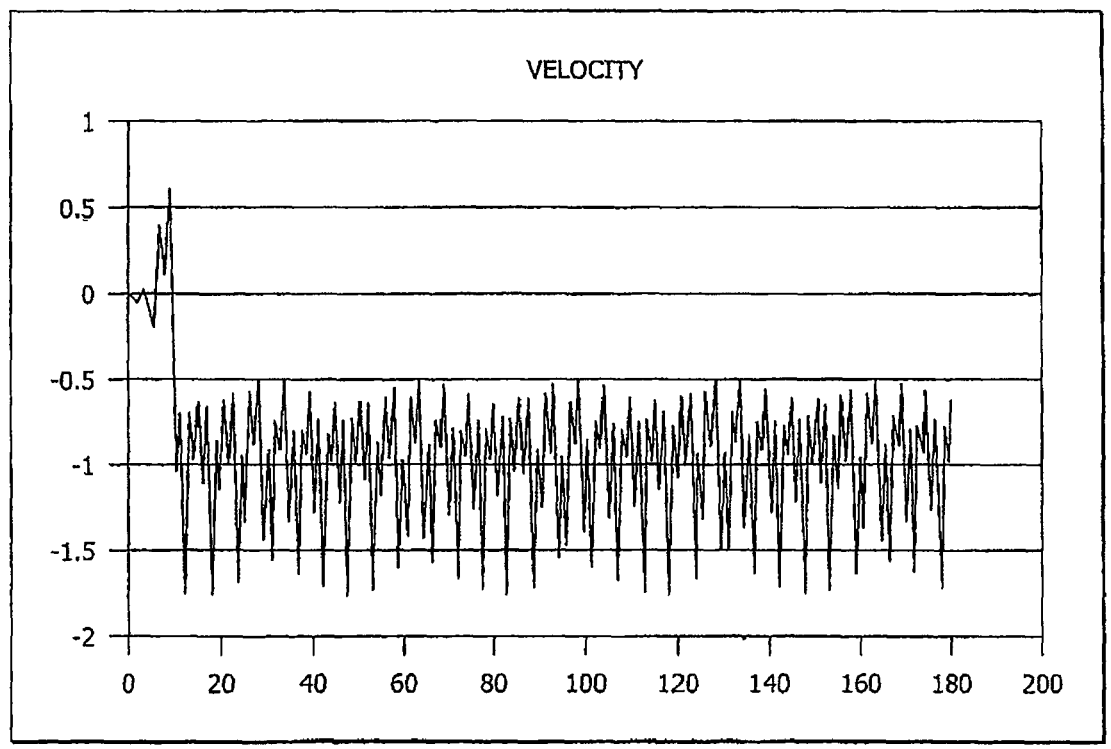
FIG. 13 is a velocity plot for an optimized system in accordance with the present invention.

Reference to FIGS. 12 and 13 further demonstrates the significance of the present system. FIG. 12 is a velocity plot of an untuned buoy pendulum. Note that the pendulum velocity is at low velocity, or zero velocity, shown as the midpoint along the vertical axis, for a significant portion of time. As described above, at low or zero velocity, each buoy generates greatly reduced power. By contrast, FIG. 13 is a velocity plot for an optimized buoy pendulum according to the present invention. As seen, pendulum velocity reaches a resonant state, moving in a constant direction, over a short time period. The repetitive velocity phase pattern results from multiple wave period and slopes acting upon the system. Significantly, even when the system is initialized at zero velocity, once optimized, the system will achieve resonance with no further control required. This concept is important as it demonstrates that once a system is appropriately tuned, constant adjustment is not required. Rather, as described above, relatively slow adjustments are required to align with changing environmental conditions.

According to a preferred embodiment, code implementations consider a wide-range of conditions to provide an effective model. By way of example, transient accelerations must be understood and accounted for in design to assure adequate strength of the mechanical components, as well as for electrical output and system tuning. Transient acceleration on the working mass are modeled and expressed in a form where the sine value of a power is given by a large odd integer (e.g., 13, 157, etc.). This does not affect the wave period value, but refines the period of the wave about the point having values of plus/minus one. As a further result, the sine curve flattens in along the curve away from values of plus/minus one. This scaling factor, when combined with a higher max_g factor (e.g., 2), cause the mathematical model to yield velocity values for the pendulum more consistent with those observed. A code implementation according to a preferred embodiment is shown below.

```perl
#! /usr/bin/perl -w
# wave_01.pl
# Steve Hench
# 2006/09/30
# Purpose
# Simulates motion of a pendulum with wave action as the driver.
use strict;
# time variables
my $timestep = 0.01;      # Timestep in sec.
my $time = 0;             # Current time.
my $time_end = 60 * 60 * 1; # Ending time of the simulation (sec).
my $t_report = 1.0;       # Time interval in for reporting (sec).
my $t_report_count = 0.0; # Counter for t_report (initialize to 0).
my $gear_ratio = 52;      # Gear ratio to the generator.
my $rpm_min = 0;          # Minimum effective rpm of generator.
# pendulum variables
my $p_len = 2.5;          # Length of pendulum in meters.
my $p_mass = 500;         # Pendulum mass in kilograms.
my $p_vel = 0.01;         # Pendulum velocity in meters per second. Vel vector
                          # approximates to linear given sufficiently small timesteps.
my $p_vel_old = 0;        # Previous velocity so that average can be determined.
my $p_ke = 0;             # Current kinetic energy of pendulum.
my $p_ke_tot = 0;         # Accumulated kinetic energy of the pendulum over time.
my $p_theta = 0;          # Current angle of the pendulum.
my $p_force = 0;          # Current force of g acting on pendulum = g_now * sin (p_theta)
my $p_acc = 0;            #     Acceleration acting on pendulum
my $p_circum = 0;         # Distance around circle made by pendulum...only needs to be
                          #     computed once.
```

```
my $p_ke_max = 0;       # Maximum kinetic energy during a timestep.
my $p_ke_harv_max = 0;  # Maximum kinetic energy harvested during a timestep (Joules).
my $p_power_max = 0;    # Maximum power = ke / timestep.
my $p_vel_max = 0;      # Maximum velocity during a timestep.
my $p_f_drag = 0.1;     # Drag factor on the pendulum (0 means no drag).
# wave variables
my $w_period = 20.0;    # Time for a complete wave period in seconds.
my $g_max = 2;          # Max gravity force along wave slope. 2.0 low 2.7 very steep.
                        # G varies from g_max to -g_max as the sin(t) of the period.
my $g_now = 0;          # Current value for g.
my $slope_wind_now = 0; # Intermediate value for the wind curve slope.
my $slope_swell_now = 0; #Intermediate value for the swell curve slope.
my $s_factor = 281;     # Exponential factor to sharpen the shape of the wave slope and
                        # make the wave more impulse-like as value exceeds 1.
                        # Value cannot be less than 1 as that yields a complex number.
                        # NOTE: s_factor must be a positive ODD integer..
# wave variables for swell and wind driven waves.
my $w_period_wind = 5.0;
my $w_period_swell = 8.3;
my $g_wind = 2.5719;    # g also represents steepness. Total of wind and swell should not
my $g_swell = 1.5845;   # exceed 3, at which point waves would be breaking.
my $pi = 3.1415927;     # Value of pi
# The buoy tilts because the pendulum mass is off center.
# This should be factored in to the total force acting on the pendulum.
my $tilt_angle = 3.0;   # angle of tilt in degrees
my $tilt_factor = 9.8 * 0.08715;  # g * sine of tilt angle in degrees.
                        # 3 degrees = 0.05234
                        # 5 degrees = 0.08715
$ tilt_factor = 9.8 * sin($tilt_angle / 180 * $pi);    # formula (deg to rad)
# energy variables
my $e_harvest = 0;      # Energy harvested this timestep
my $e_harvest_tot = 0;  # Total Energy harvested.
my $e_harvest_vel = 0;  # velocity to begin harvesting energy --- will be computed.
my $e_harvest_ke = 0;   # kinetic energy level that equates to harvest velocity
my $e_harvest_eff = 0.061; # The effective rate of energy harvest.
my $e_revenue = 0.05;   # Market price per kilowatt hour.
# Input parameters...change with shell script.
# Two pound signs together means line will be edited by shell script.
# A space between the pound signs keeps the line as a comment, and will not
# be edited by shell script.
# #$gear_ratio = xxgear_ratio;
##$p_len = xxp_len;
# #$rpm_min = xxrpm_min;
##$e_harvest_eff = xxe_harvest_eff * 0.001;
##$w_period_swell = xxw_period_swell;
##$g_swell = xxg_swell;
##$w_period_wind = xxw_period_wind;
##$g_wind = xxg_wind;
# ****************************** Begin program ********************************
# Compute the distance around the pendulum's circle.
$p_circum = $p_len * 2 * $pi;
# Compute the energy harvest kinetic energy threshold.
$e_harvest_vel = 2 * $p_len * $pi * $rpm_min / $gear_ratio / 60;
$e_harvest_ke = 0.5 * $p_mass * $e_harvest_vel * $e_harvest_vel;
# $t_report = $t_report / $timestep;
while ($time < $time_end)
{
    # Based on current time, compute the value of g_now.
#   $g_now = $g_max * sin ($time / $w_period * (2 * $pi));
    $slope_wind_now = cos ($time / $w_period_wind * (2 * $pi));
    $slope_swell_now = cos ($time / $w_period_swell * (2 * $pi));
#   if (($s_factor > 1) && ($s_factor % 2) > 0)
#   {
#       if ($slope_wind_now < 0)
#       {
#           $slope_wind_now = -1 * ($slope_wind_now ** $s_factor);
#       }
#       else
#       {
#           $slope_wind_now = $slope_wind_now ** $s_factor;
#       } #end if
#   } # end if
#   $g_now = $g_wind * (cos ($time / $w_period_wind * (2 * $pi))) +
#           $g_swell * (cos ($time / $w_period_swell * (2 * $pi)));
    $g_now = $g_wind * $slope_wind_now + $g_swell * $slope_swell_now;
    # Force acting on pendulum depends on its current angle.
    # The pendulum accelerates, and its velocity and position are
    # determined.
    # so that the system doesn't get stuck, watch for p_theta and p_vel = 0
    if (($p_theta == 0) && ($p_vel == 0))
```

```
        {
            $p_theta -= $pi / 1000;
        } # end if
        # Constrain p_theta to just one revolution of the circle.
        if ($p_theta > (2 * $pi))
        {
            $p_theta -= 2 * $pi;
        } # end if
        if ($p_theta < (-2 * $pi))
        {
            $p_theta += 2 * $pi;
        } # end if
        # Compute acceleration.
#       $p_acc = $g_now * abs (sin($p_theta));
        $p_acc = $g_now * sin($p_theta)
            - $tilt_factor * cos($p_theta);
        # The acceleration is muliplied by the time step and added to the
#           existing velocity.
        $p_vel_old = $p_vel;
        $p_vel += $p_acc * $timestep;
        # reset the max velocity found
        if (abs ($p_vel) > $p_vel_max)
        {
            $p_vel_max = abs ($p_vel);
        } # end if
        # Determine the new position in theta by multiplying the velocity and timestep.
        $p_theta += ($p_vel_old + $p_vel) / 2 * $timestep / $p_circum * 2 * $pi;
        # Determine the kinetic energy of the pendulum
        $p_ke = 0.5 * $p_mass * $p_vel * $p_vel;
        if ($p_ke > $p_ke_max)
        {
            $p_ke_max = $p_ke;
        } # end if
        $p_ke_tot += $p_ke * $timestep / 3600;
        if ($t_report_count >= $t_report)
        {
        # print STDOUT "$time $g_now $p_acc $p_vel $p_ke $p_ke_tot\n";
        # print STDOUT "$p_acc $g_now\n";
        # print STDOUT "$time $p_theta $p_vel $p_ke $p_ke_tot $e_harvest_tot\n";
        print STDOUT "$time $p_vel $p_theta $e_harvest_tot $g_now $e_harvest\n";
        $t_report_count = 0.0;
        } # end if
        # Set up for next loop.
        # Drag factor applies to velocity.
        # if the velocity is high enough to generate 12 volts, start harvesting
        # the energy. The energy harvest is proportional to the velocity above that
        # point.
        $e_harvest = 0;
        if ($p_ke > $e_harvest_ke)
        {
            # Take a part of the ke above the threshold
#           $e_harvest = $timestep * 10 * $e_harvest_eff * ($p_ke - $e_harvest_ke);
            $e_harvest = ($p_ke - $e_harvest_ke) * $timestep * $e_harvest_eff;
#           $e_harvest_tot += $e_harvest / $timestep / 3600;
            $e_harvest_tot += $e_harvest / 1000; # to keep units in kilowatts
            # Record the new maximum KE harvested.
            if ($e_harvest > $p_ke_harv_max)
            {
                $p_ke_harv_max = $e_harvest;
            } # end if
            # Compute new velocity based on energy taken.
            if ($p_vel > 0)
            {
                # If velocity is positive.
                $p_vel = sqrt (($p_ke - $e_harvest) / 0.5 / $p_mass);
#               $p_vel -= sqrt ($e_harvest / 0.5 / $p_mass);
            } else
            {
                # Velocity is negative.
                $p_vel = -1 * sqrt (($p_ke - $e_harvest) / 0.5 / $p_mass);
#               $p_vel += sqrt ($e_harvest / 0.5 / $p_mass);
            } # end if
        } # end if
        # Drag.
        $p_vel = $p_vel * (1 - ($p_f_drag * $timestep ));
        # Time and Timestep accounting.
        $time += $timestep;
        $t_report_count += $timestep;
} # end while time
# print summary
```

-continued

```
$p_power_max = $p_ke_harv_max / $timestep;
$e_harvest_tot = $e_harvest_tot / $time;
$e_revenue = $e_harvest_tot * 0.05;
print STDOUT "\n";
print STDOUT "Timestep: $timestep\n";
print STDOUT "Vel threshold: $e_harvest_vel m/s\n";
print STDOUT "KE threshold: $e_harvest_ke Joules\n";
print STDOUT "Energy harvested: $e_harvest_tot Kilowatts\n";
print STDOUT "Max velocity: $p_vel_max m/s\n";
print STDOUT "Max ke: $p_ke_max Joules\n";
print STDOUT "Max ke harvested: $p_ke_harv_max Joules\n";
print STDOUT "Max power = $p_power_max Watts\n";
print STDOUT "Revenue = \$$e_revenue\n";
# remove the last timestep increment
$time -= $timestep;
print STDOUT "Ending time is $time Sec\n";
exit 0
```

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A computer readable medium, said medium comprising:
   logic for measuring environmental conditions;
   logic for determining an optimized pendulum setting for said measured conditions; and
   logic for varying the effective length of said pendulum or the resistance placed upon said pendulum to optimize power output of said pendulum according to said determined optimized pendulum setting.

2. The computer readable medium of claim 1 further comprising logic for measuring conditions remotely from said pendulum and transmitting said measurements locally to said pendulum, wherein said measurements are used to determine said optimized pendulum setting.

3. The computer readable medium of claim 1 further comprising logic for computing instructions to achieve said optimized setting locally at said pendulum.

4. The computer readable medium of claim 1 further comprising logic for retrieving said setting from a central database.

5. The computer readable medium of claim 1 further comprising logic for comparing said measured environmental conditions against environmental conditions stored in a database and deriving said setting based, at least in part, upon said comparison.

6. The computer readable medium of claim 1 further comprising logic for transmitting and receiving said measured environmental conditions and said determined instructions.

7. The computer readable medium of claim 1 further comprising logic for storing at least one optimized pendulum setting associated with a first set of measured environmental conditions.

8. A method of optimizing power output of a pendulum rotating under the influence of wave motion, said method comprising:
   evaluating power output of said pendulum;
   optimizing the power output by varying in the effective length of said pendulum or the resistance placed upon said pendulum; and
   measuring environmental conditions and optimizing the power output of said pendulum in response to said measuring;
   wherein said measuring environmental conditions is performed remote from said pendulum.

9. The method of claim 8 wherein said varying is performed, at least in part, in response to comparing said measured environmental conditions to environmental conditions stored in a database.

10. A method of optimizing power output of a pendulum rotating under the influence of wave motion, said method comprising:
    evaluating power output of said pendulum; and
    optimizing the power output of said pendulum by varying the effective length of said pendulum or the resistance placed upon said pendulum;
    wherein said optimization of the power output is performed remote from said pendulum.

11. The method of claim 10 wherein said optimization of the power output further comprises transmitting instructions from said remote location to said pendulum to vary the effective length of said pendulum or the resistance placed upon said pendulum.

12. A method of optimizing power output of a pendulum rotating under the influence of wave motion, said method comprising:
    evaluating power output of said pendulum;
    optimizing the power output of said pendulum by varying the effective length of said pendulum or the resistance placed upon said pendulum; and
    storing at least one optimized pendulum setting associated with a first set of measured environmental conditions.

13. A method of optimizing power output of a pendulum rotating under the influence of wave motion, said method comprising:
    evaluating power output of said pendulum;

optimizing the power output of said pendulum by varying the effective length of said pendulum or the resistance placed upon said pendulum; and determining instructions to achieve said optimization; wherein said instructions are retrieved from a central location.

14. A power optimization network, said network comprising:
- a first plurality of buoys, said buoys comprising at least one pendulum generating power under the influence of wave motion and a communication module for transmitting information relating to power output of said pendulum; and
- a first central station in communication with said first plurality of buoys, said first central location comprising a database for storing said transmitted information and transmitting instructions comprising one or more pendulum settings optimized according to said power output information.

15. The network of claim 14 wherein said one or more pendulum settings are configured to optimize the power output of said pendulum.

16. The network of claim 15 wherein said first plurality of buoys further comprising a measurement module for measuring environmental conditions, and wherein said communication module further transmits and receives information relating to said measured environmental conditions with said first central location.

17. The network of claim 16 wherein said optimization of the power output of said pendulum is based, at least in part, upon said measured environmental conditions.

18. The network of claim 14 wherein said instructions comprising instructions to vary the effective length of said at least one pendulum or the resistance placed upon said at least one pendulum.

19. The network of claim 14 further comprising:
- a second plurality of buoys, said second plurality of buoys comprising:
  - a pendulum for generating power under the influence of wave motion and a communication module for transmitting information relating to power output of said pendulum; and
- a second central station in communication with said second plurality of buoys, said second central location comprising:
  - a communication module for communicating with said first central station.

* * * * *